US012085229B2

(12) United States Patent
Fleischer et al.

(10) Patent No.: US 12,085,229 B2
(45) Date of Patent: Sep. 10, 2024

(54) FOUR-LOBE CARGO TANK FOR TRANSPORTING AND / OR STORAGE OF LIQUIFIED GASES

(71) Applicant: Karbon CCS ltd., Valletta (MT)

(72) Inventors: Henrik Fleischer, Slependen (NO); Knut Erik Børseth, Sandefjord (NO); Nils Christian Høy-Petersen, Haslum (NO)

(73) Assignee: KARBON CCS LTD., Valletta (MT)

( * ) Notice: Subject to any disclaimer, the term of this patent is extended or adjusted under 35 U.S.C. 154(b) by 85 days.

(21) Appl. No.: 17/983,847

(22) Filed: Nov. 9, 2022

(65) Prior Publication Data

US 2024/0151353 A1 May 9, 2024

(51) Int. Cl.
*F17C 1/08* (2006.01)

(52) U.S. Cl.
CPC ........ *F17C 1/08* (2013.01); *F17C 2201/0152* (2013.01); *F17C 2201/0171* (2013.01); *F17C 2203/012* (2013.01); *F17C 2205/0352* (2013.01); *F17C 2221/013* (2013.01); *F17C 2221/033* (2013.01); *F17C 2270/0105* (2013.01)

(58) Field of Classification Search
CPC ................ F17C 1/08; F17C 2201/0152; F17C 2201/0171; F17C 2203/012; F17C 2205/0352; F17C 2221/013; F17C 2221/033; F17C 2270/0105
See application file for complete search history.

(56) References Cited

U.S. PATENT DOCUMENTS 3,414,153 A 12/1968 Leroux
4,840,282 A 6/1989 Gerhard
(Continued)

FOREIGN PATENT DOCUMENTS

DE 1 229 048 B 11/1966
DE 31 25 963 A1 2/1983
(Continued)

OTHER PUBLICATIONS

Norwegian Search Report for Norwegian Application No. 20221199, dated Feb. 17, 2023, with an English translation.
(Continued)

*Primary Examiner* — Kareen K Thomas
(74) *Attorney, Agent, or Firm* — Birch, Stewart, Kolasch & Birch, LLP

(57) ABSTRACT

A four-lobe cargo tank for transporting and/or storage of liquefied gases includes four main lobes, each with a cylinder sector outer shell and main lobe axis. The four main lobes are arranged with the four main lobe axis axial-parallel with and about a common main central axis, such that the four main lobes are joined by four web frames with four corresponding diagonally arranged perforated bulkheads directed outwardly from the main central axis. The tank includes a first and a second end cover. Each end cover includes four quarter spherical shell portions, each forming an end portion of the cylinder sector outer shell. The quarter spherical shell portions of the first and second end covers, respectively, are joined and closing toward the main central axis by a first and a second four diagonally arranged cylindrical 45-degree cut pipe portions, which are each arranged with its axis transverse to the main axis.

20 Claims, 9 Drawing Sheets

(56) References Cited

U.S. PATENT DOCUMENTS

Figures 1A, 1B, 1C:
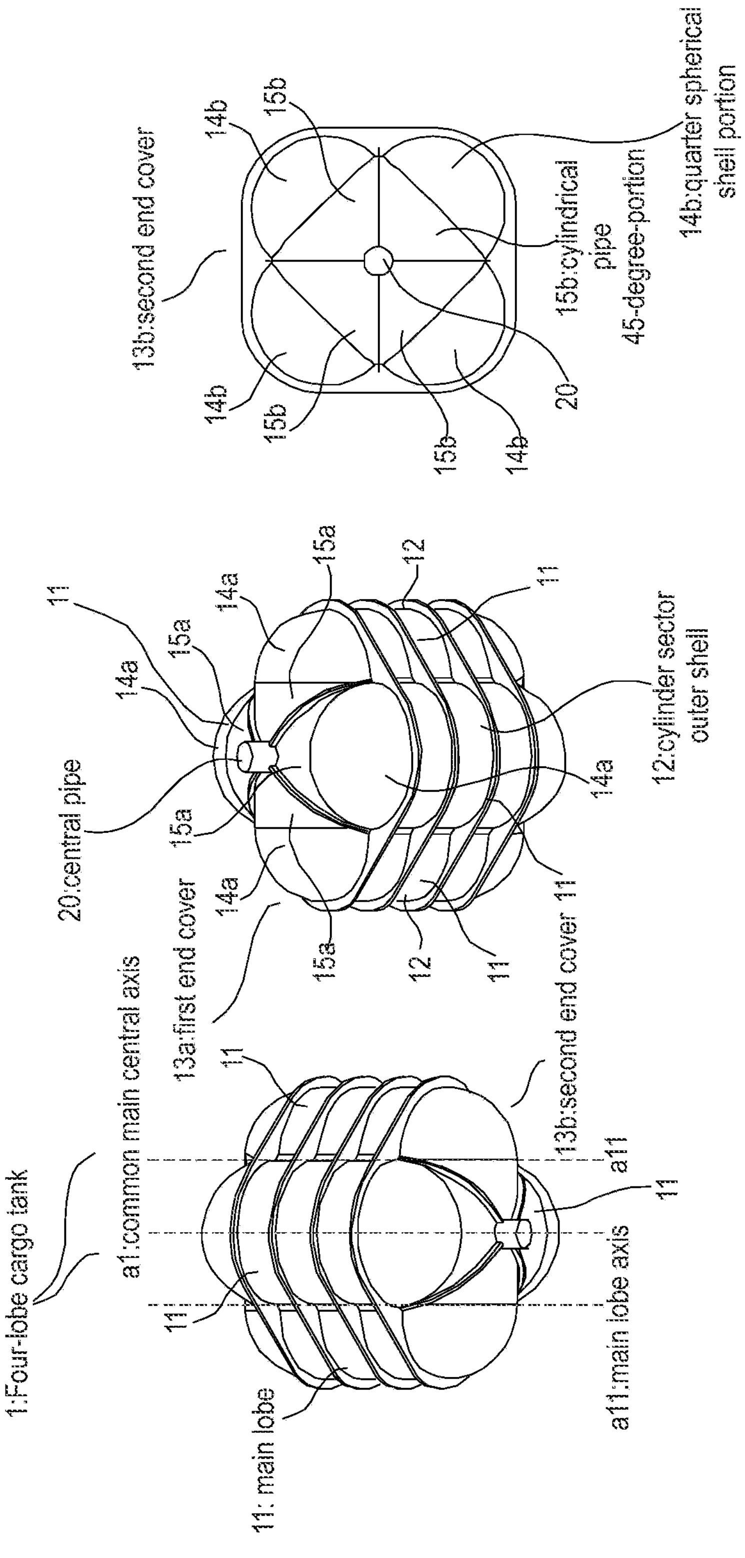

| | | | | |
|---|---|---|---|---|
| 9,884,552 | B2 * | 2/2018 | Sloan | F17C 13/083 |
| 2014/0117163 | A1 | 5/2014 | Simpson | |
| 2014/0217107 | A1 * | 8/2014 | Sloan | B60P 7/12 29/428 |
| 2014/0224169 | A1 * | 8/2014 | Morimoto | F17C 13/082 114/74 R |
| 2014/0238052 | A1 * | 8/2014 | Shin | F17C 13/08 62/53.2 |
| 2014/0290279 | A1 * | 10/2014 | Lee | F25J 1/0277 123/3 |
| 2014/0291331 | A1 * | 10/2014 | Morales | F17C 1/14 220/565 |
| 2014/0369765 | A1 * | 12/2014 | Fargier | E02B 17/00 114/74 R |
| 2015/0020604 | A1 * | 1/2015 | Lee | G01P 15/093 73/800 |
| 2015/0033769 | A1 * | 2/2015 | Chun | B63B 19/00 29/428 |
| 2015/0122821 | A1 * | 5/2015 | Nettis | F17C 1/002 220/560.11 |
| 2015/0135734 | A1 * | 5/2015 | Carlander-Reuterfelt | B63B 25/16 62/53.2 |
| 2019/0331296 | A1 | 10/2019 | Ramoo et al. | |
| 2021/0348719 | A1 | 11/2021 | Ramoo et al. | |

FOREIGN PATENT DOCUMENTS

| | | | |
|---|---|---|---|
| DE | 36 06 247 | C1 | 5/1987 |
| EP | 3 318 791 | A1 | 5/2018 |
| FR | 1.937.900 | A | 9/1953 |
| FR | 1.254.987 | | 3/1961 |
| FR | 1364757 | A | 6/1964 |
| KR | 20-0388093 | Y | 6/2005 |
| KR | 10-2012-0034391 | A | 4/2012 |

OTHER PUBLICATIONS

International Search Report for International Application No. PCT/NO2023/060086, dated Mar. 5, 2024.

* cited by examiner

FOUR-LOBE CARGO TANK FOR TRANSPORTING AND / OR STORAGE OF LIQUIFIED GASES

FIELD AND BACKGROUND OF THE INVENTION

The present invention relates to the field of transporting and/or storage of liquified gases in a tank, more specifically in a four-lobe cargo tank. Pipelines may provide a possible transport for short runs, but the for long distances the capital cost will be prohibitively high, so an alternative transport of captured CO2 from an initial source to a facility of usage or long-term isolation of captured CO2 is needed.

The applicant has been working with development of carbon capture systems for decades and within this field there are missing facilities for storage and transportation of the captured Carbon Dioxide (CO2). To transport the captured CO2 in an efficient and economical manner initiated the present invention. As an example, Carbon capture plants may be located in South Korea and recipients for using CO2 for enhanced oil recovery (EOR) may be located in USA and/or Persian Gulf. An efficient and economical trade for such a long haul advantageously also includes cross trades to utilize the cargo transport capacity in both directions. An efficient cross trade can be to ship the CO2 from South Korea to USA and/or Persian Gulf and return with e.g. liquid natural gas (LNG).

PRIOR ART

European patent application, EP3318791 A1, describes a multi-lobe tank for containing liquefied gas, for mounting into a hull of a vessel. The tank comprises at least a first longitudinally extending multi-lobe tank part having a center line A and a second longitudinally extending multi-lobe tank part having a center line B that are positioned one behind the other resulting in a forward multi-lobe tank part and a rear multi-lobe tank part with aligned center lines A, B. More specifically the patent application claims a multi-lobe tank for containing pressurized liquids, such as liquefied gas, for mounting into a ships hull, wherein the tank comprises at least a first longitudinally extending multi-lobe tank part having a center line and a second longitudinally extending multi-lobe tank part having a center line that are positioned one behind the other resulting in a forward multi-lobe tank part and a rear multi-lobe tank part with aligned center lines, wherein the first part is tapered towards an end of the first part. The invention in EP3318791 A1 is initiated to reduce the gravity center of said multi-lobe tank and therefor increase the stability of the vessel, a three-lobe cargo tank with two lobes at the tank top and one on the top of those two is therefor a preferred embodiment for that invention.

Another patent application, US2021348719 A1, describes a storage tank having a generally cubic configuration. The storage tank includes four vertically oriented cylindrical walls positioned approximately 90 degrees apart from one another and an outer support structure is coupled to the outer surface of the storage tank. The tank has an internal bulkhead structure between the four vertical cylinders where a membrane inner portion is configured to partially obstruct a flow of liquid.

The present invention is generally concerned with solving one problem related to the prior art.

BRIEF SUMMARY OF THE INVENTION

The invention is defined by the attached independent claim 1 which is a four-lobe cargo tank for transporting and/or storage of liquified gases, wherein the tank comprises four main lobes each with a cylinder sector outer shell and main lobe axis, said four main lobes arranged with said four main lobe axis axial-parallel with and about a common main central axis, said four main lobes joined by four web frames with four corresponding diagonally arranged perforated bulkheads directed outwardly from said main central axis, said tank further comprises first and second end covers each end cover comprising four quarter spherical shell portions each forming an end portion of said cylinder sector outer shell, said quarter spherical shell portions of said first and second end covers respectively, joined and closing toward said main central axis by first and second four diagonally arranged cylindrical 45-degree cut pipe-portions each arranged with its axis transverse to said main axis.

In an embodiment of the present invention it also relates to a method of transporting gas, comprising a vessel with at least one four-lobe cargo tank, for loading liquefied natural gas (LNG) under cryogenic conditions to said one or more four-lobe tanks at an LNG loading terminal, and sailing said vessel to an LNG unloading terminal for unloading said liquefied natural gas (LNG) at said unloading terminal for consumption and if necessary, sailing said vessel (0) to a loading terminal for liquefied carbon Dioxide (CO2) for loading captured liquefied Carbon Dioxide (CO2) into said one or more four-lobe tanks, for then sailing said captured liquefied Carbon Dioxide (CO2) to a liquefied Carbon Dioxide (CO2) unloading terminal, for permanent storage, or for industrial consumption.

An advantage of this embodiment solves problems related to transport of combined cargo e.g. high density pressurized cargo during one voyage and cryogenic temperature performance down to liquefied natural gas on the return voyage, increasing the efficiency of the vessel and indirectly reduces the costs.

Further inventive embodiments of the invention are set out in the dependent claims.

FIGURE DESCRIPTIONS

Embodiments of the present invention will now be described, by way of example only, with reference to the following figures, wherein:

FIG. 1*a* shows in a isometric view an embodiment of the four-lobe cargo tank (1), with its four main lobes (11), as seen towards its second end cover (13*b*) to make the common main central axis (a1) and mail lobe axis' (a11) more apparent. As illustrated in the Figure the common main central axis (a1) is in the center of the four-lobe cargo tank (1). The Figure further shows that the main lobe axes (a11) in the cylinder-sector center of each of the main lobes (11), respectively. Each of the four lobes (11) has its own main lobe axis (a11).

FIG. 1*b* shows an embodiment of the four-lobe cargo tank (1), with its four main lobes (11), in an isometric view as seen towards its first end cover (13*a*), which is the top end cover (13*a*) in an upright configuration of the common main central axis (a1). FIG. 1*b* shows the cylinder sector outer shell (12) of each main lobes (11), which holds a form like a half part of a cylindrical tube and extend from the first end cover (13*a*) to the second end cover (13*b*). FIG. 1*b* shows the first end cover (13*a*) comprising:

four of quarter-spherical shell portions (14*a*)

four of cylindrical 45-degree cut pipe portions (15*a*)

a central common pipe (20).

FIG. 1*c* shows an end view of an embodiment of second end cover (13*b*) of the four-lobe cargo tank (1). FIG. 1*c* shows the second end cover (13*b*) comprising:

four of quarter spherical shell portions (14*b*)

four of cylindrical 45-degree cut pipe portions (15*b*)

a central common pipe (20).

Figures 2A, 2B, 2C, 2D:
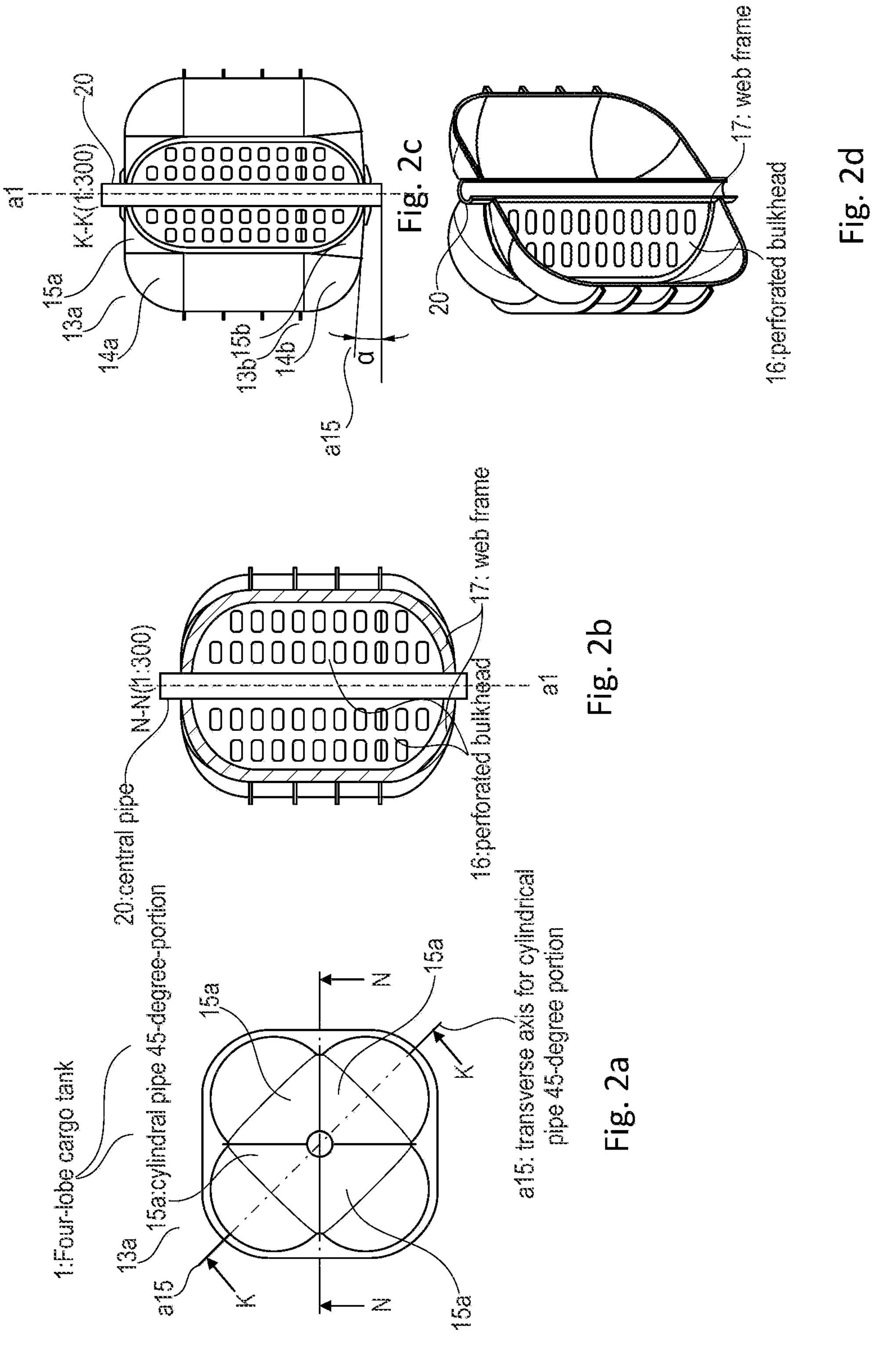

FIG. 2*a* shows in an end view an embodiment of the first end cover (13*a*) of the four-lobe cargo tank (1). FIG. 2*a* shows a diagonally extending transverse axis (a15) between two of the four cylindrical 45-degree cut pipe portion (15*a*), indicated by a dotted line K-K. Said transverse axis (a15) is a diagonal centerline across the first and also the second end cover (13*a*, 13*b*) between those two mutually facing cylindrical 45-degree cut pipe portions. FIG. 2*a* also show a centerline, marked N-N, that divides the four main-lobe cargo tank (1) said first end cover (13*a*) into two halves.

FIG. 2*b* shows a combined elevation and section view of an embodiment of the four-lobe cargo tank (1) cross-section at said centerline N-N, as indicated in FIG. 2*a*, wherein the internal structure, such as perforated bulkheads (16) and web frames (17) are shown, including the central pipe (20). As shown in the Figure, said web frame (17) extends between a first and a second end portion of said central pipe (20), and said perforated bulkhead (16) is arranged enveloped in the area between said web frame (17) and said central pipe (20) as shown. Another embodiment [not shown] is to arrange the perforated bulkheads (16) between said web frames (17) and are join them together at the common main central axis (a1) wihtout any central pipe (20).

FIG. 2*c* shows in a combined elevation and section view an embodiment of a cross-section of the four-lobe cargo tank (1) at said dotted line K-K, as indicated in FIG. 2*a*, wherein one of said transverse axes (a15) of said second end cover (13*b*), is indicated with an inclining angle $\alpha$, from a baseline which is orthogonal to said common main central axis (a1). The Figure further shows said first and second end covers (13*a*, 13*b*) comprising their quarter spherical shell portions (14*a*, 14*b*) and cylindrical 45-degree cut pipe portions (15*a*, 15*b*). A cross-section of said central pipe (20) is also shown in the Figure.

FIG. 2*d* shows a combined isometric view and diagonal cross section of an embodiment of the same cross-section as in FIG. 2*b* of the four-lobe cargo tank (1), for providing an overview of the internal space of the four-lobe cargo tank (1) and its internal structures comprising a perforated bulkhead (16) and a web frame (17) and a cross-section of the central pipe (20).

Figure 3C:
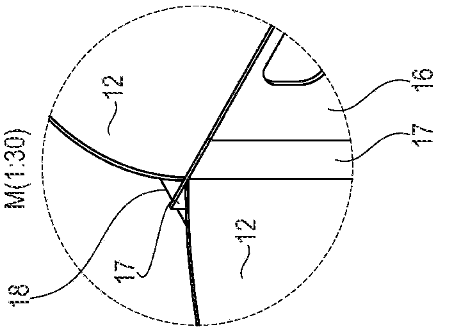
Figure 3B:
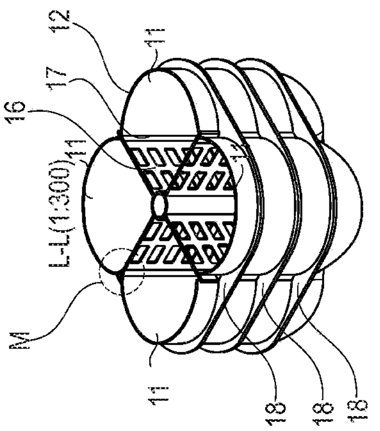
Figure 3A:
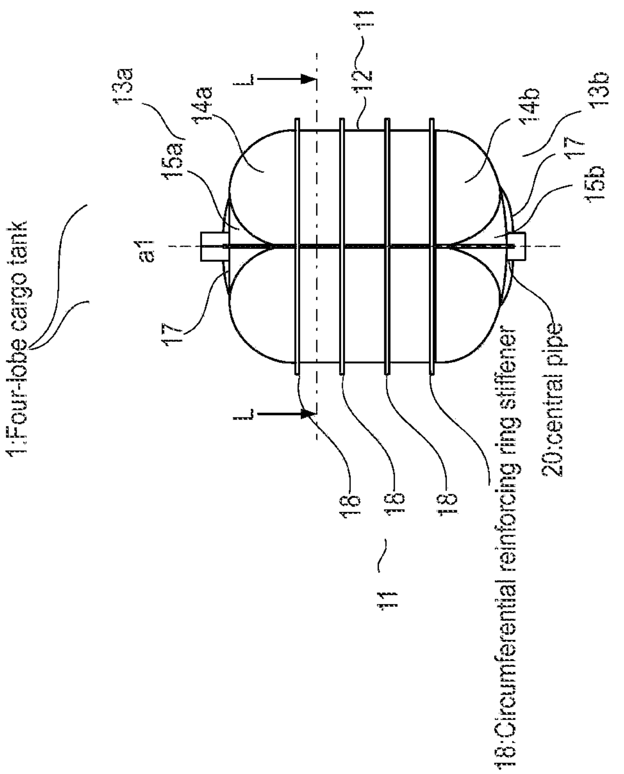

FIG. 3*a* shows an elevation side view of the four-lobe cargo tank (1) comprising main lobes (11) arranged with reinforcing ribs (18). The Figure further shows that the web frames (17) partly protrude between said main lobes (11) near said central pipe (20) at said first and second end covers (13*a*, 13*b*) and join the main lobes (11) cylindrical 45-degree cut pipe portions (15*a*, 15*b*) which further join said quarter spherical shell portions (14*a*, 14*b*). FIG. 3*a* shows an embodiment wherein said reinforcing ribs extends about said cylinder sector outer shells (12). A dotted an axis-transverse line, marked L-L, is marked across a portion (which may in an embodiment be an upper portion) of the Figure, as a mark for where the cross-section plane in the isometric section view in next Figure, FIG. 3*b* is taken.

FIG. 3*b* shows an isometric view and part section along the plane as marked by the line L-L in FIG. 3*a*. FIG. 3*b* shows an embodiment of the four-lobe cargo tank (1) cross-section L-L, in an isometric view, such that part of the internal structure of all four main lobes (11) are shown. FIG. 3*b* also shows a dotted circle marked M, indicating a portion of the drawing which is enlarged to show in more detail in FIG. 3*c*.

FIG. 3*c* shows the enlarged details from said dotted circle marked M from FIG. 3*b*. The Figure shows an embodiment of the four-lobe tank comprising an arrangement on assembly of said web frame (17) joining between two adjacent of said cylinder sector outer shells (12) and an arrangement for said web frame (17) and said reinforcing rib (18) (which is below the plane L-L). The Figure also shows an arrangement for said web frame (17) and said perforated bulkhead (16).

Figure 4B:
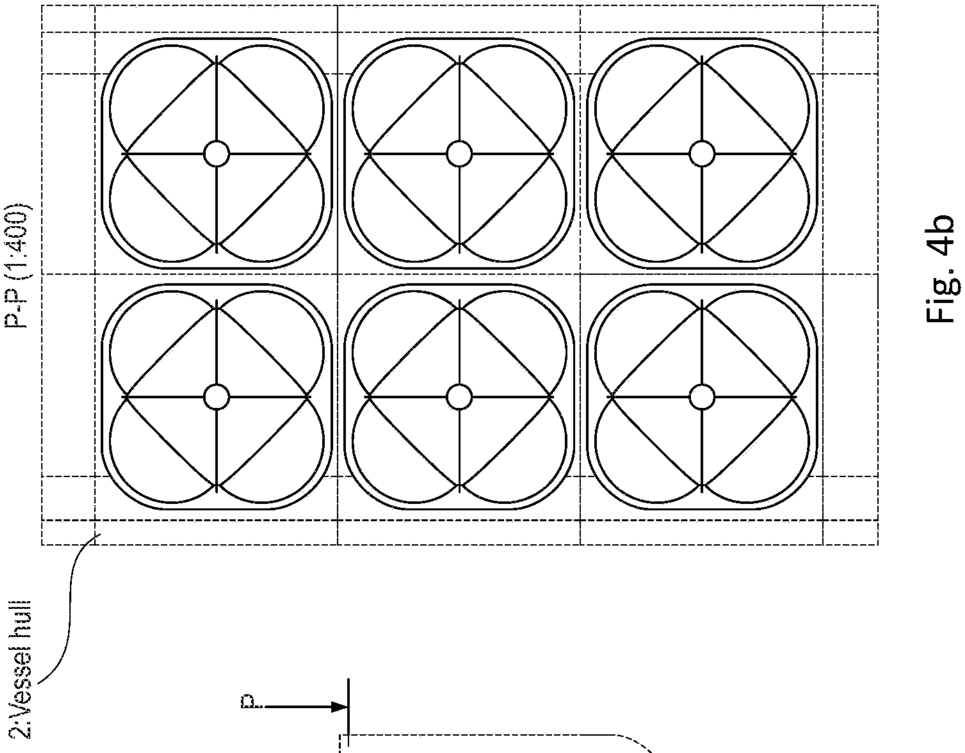
Figure 4A:
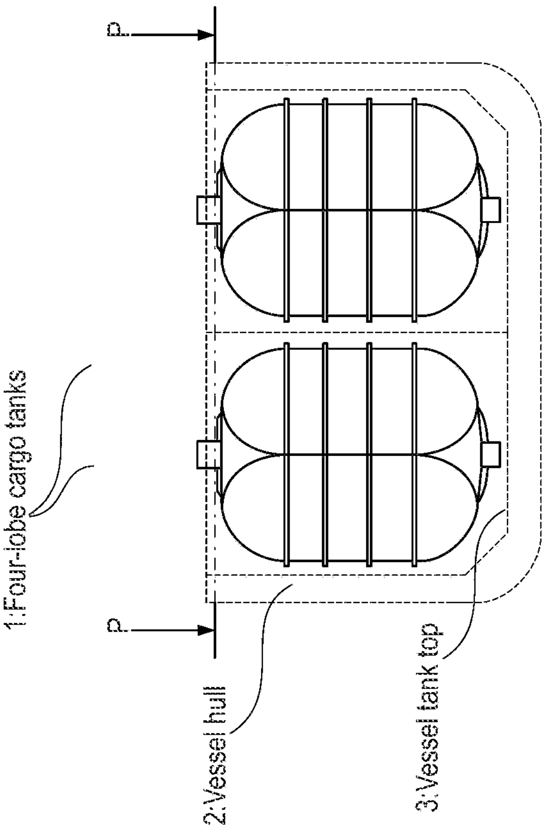

FIG. 4*a* shows an arrangement of said four-lobe cargo tanks (1) arranged as cargo tanks shown placed in a transverse section of a vessel hull (2), such as a hull of a ship, wherein said four-lobe cargo tanks (1) are arranged with each their common main central axis (a1) in a vertical position [Vertical position, as in said main central axis (a1) is mainly perpendicular on said vessel hulls tank top]. FIG. 4*a* shows an embodiment comprising two four-lobe cargo tanks (1) arranged side-by-side in said vessel hulls (2) breadth. FIG. 4 also shows a dotted line marked P-P, which indicates a plane of a cross-section view shown in FIG. 4*b*.

FIG. 4*b* shows in a top view an embodiment of the four-lobe cargo tanks (1), arranged as cargo tanks in a plane section P-P of the vessel hull (2) above. The Figure shows a plane section of a vessel hull (2) comprising the top view of two four-lobe cargo tanks (1) arranged port and starboard side by side other and in rows of three, a total number of six four four-lobe cargo tanks.

Figure 5B:
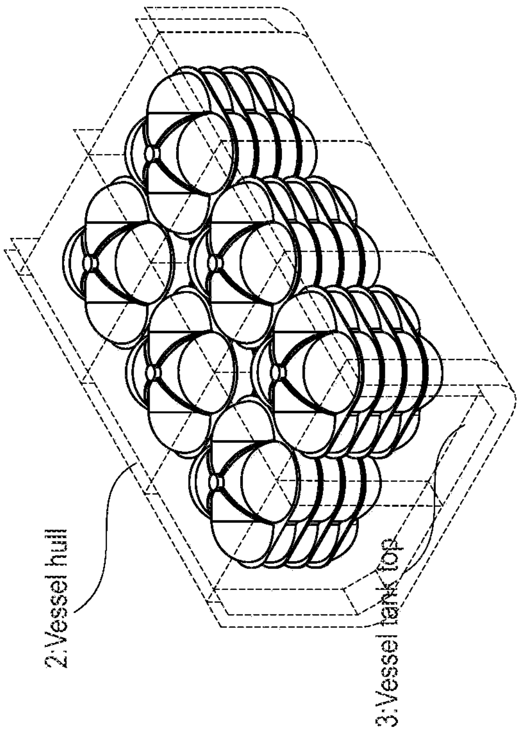
Figure 5A:
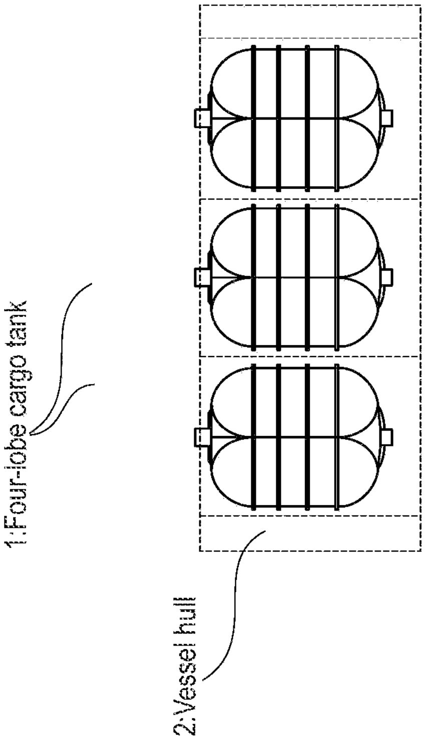

FIGS. 5*a* and 5*b* show another view of the embodiments shown in FIGS. 4*a* and 4*b*.

Figure 6C:
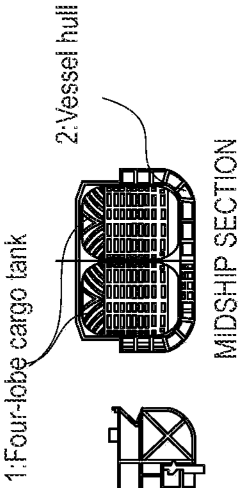
Figure 6A:
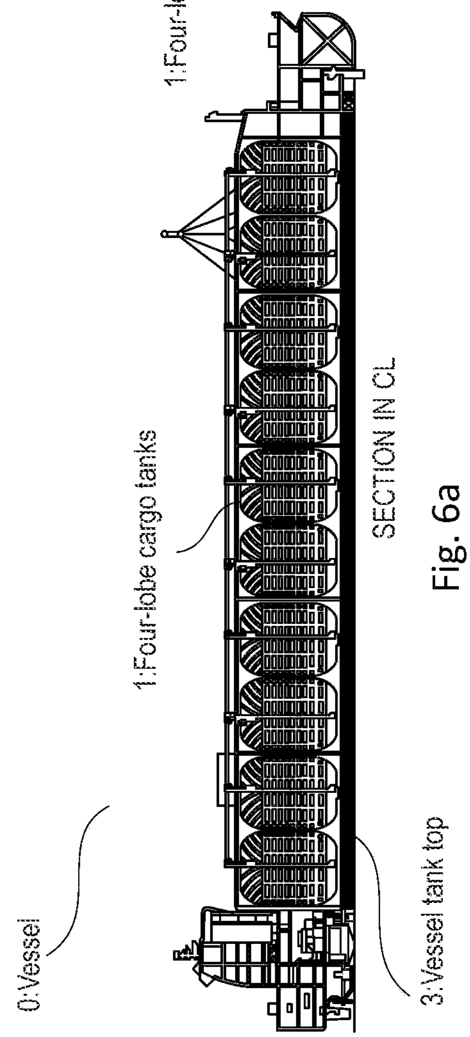
Figure 6B:
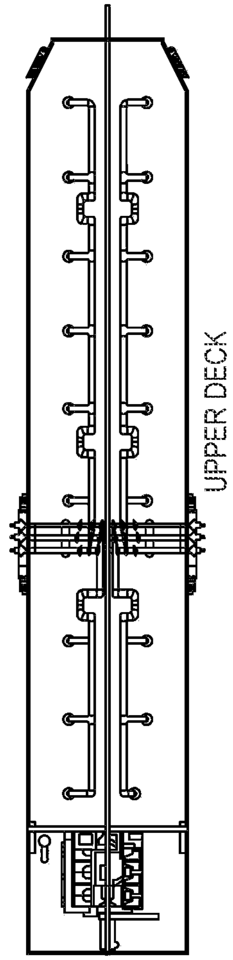

FIGS. 6*a*, 6*b* and 6*c*, show an embodiment of the four-lobe cargo tanks (1) arranged as cargo tanks onboard a vessel (0). FIG. 6*a* shows the vessel (0) section in center line, comprising vertically installed four-lobe cargo tanks (1) on vessel tank top (3). FIG. 6*b* shows an embodiment wherein an upper deck is arranged above the four-lobe cargo tanks (1). FIG. 6*c* shows a midship section view of said vessel (0) comprising two four-lobe cargo tanks (1) arranged with vertical-common main central axis (a1) within the vessel hull (2).

Figure 7A:
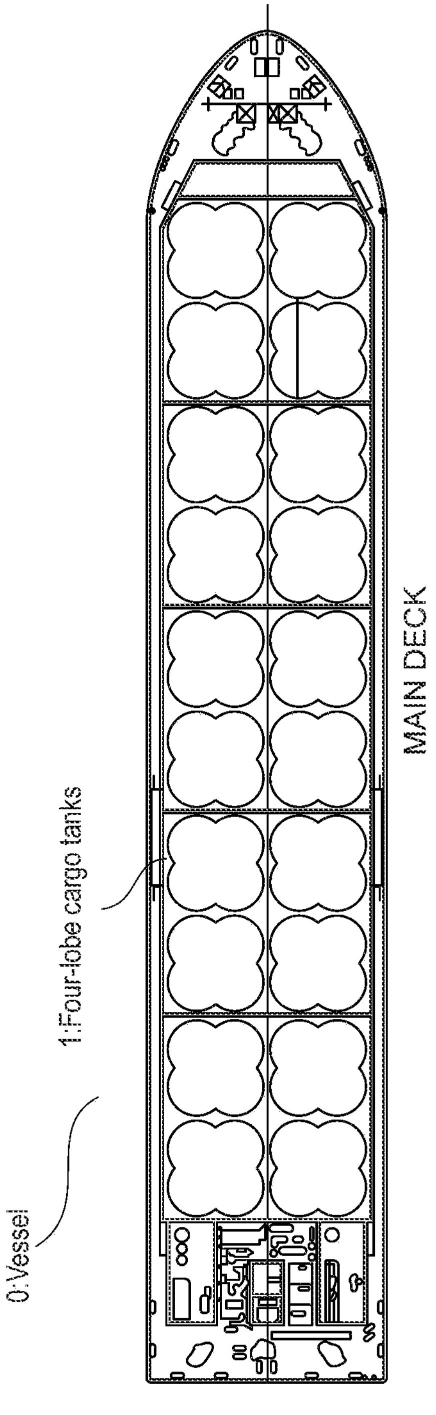
Figure 7B:
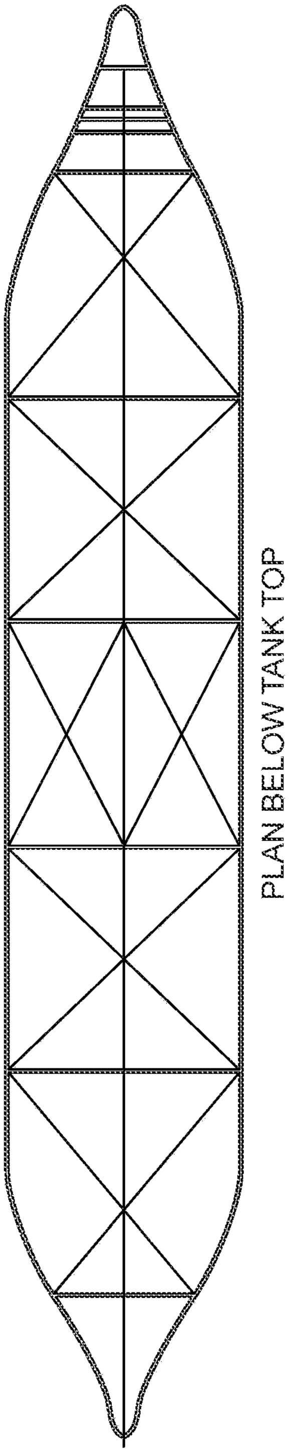

FIG. 7*a* shows an embodiment of the invention wherein said four-lobe cargo tanks (1) are installed onboard a vessel (0). FIG. 7*a* shows a plane view at main deck comprising 20 four-lobe cargo tanks (1) that are arranged then in two rows in the breadth onboard said vessel (0). FIG. 7*b* shows an embodiment of said vessel (0) in a section below tank top.

Figure 8A:
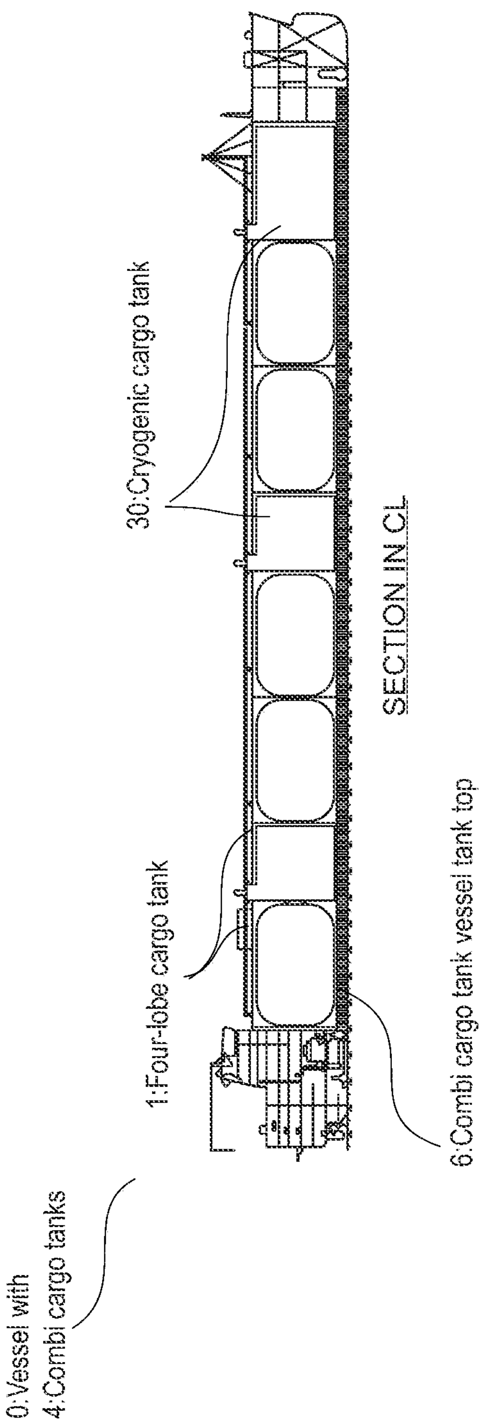
Figure 8B:
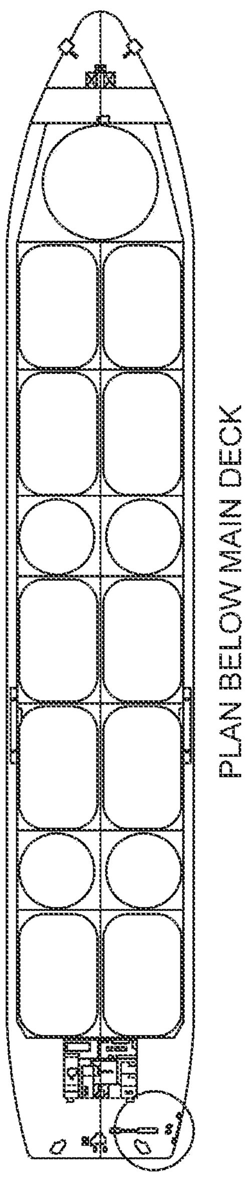

FIG. 8*a* shows an embodiment of the invention wherein four-lobe cargo tanks (1) are arranged onboard a vessel (0) with combi cargo tanks (4, 1, 30), from a center line section view. Said vessel (0) with combi cargo tanks (4) comprises both said four-lobe cargo tanks (1) and further comprises cryogenic cargo tanks (30) such as LNG-tanks. FIGS. 8*a* and 8*b* show an embodiment wherein said four-lobe cargo tanks (1) are horizontally arranged onboard said vessel (0), horizontally arranged in the meaning that said common main central axis (a1) is mainly parallel with the combi cargo tank vessel tank top (6), and with combi cargo tanks (4, 1, 30).

FIG. 8*b* shows an embodiment of the invention wherein said four-lobe cargo tanks (1) and said cryogenic cargo tanks (30) installation onboard said vessel (0) with combi cargo tanks (4, 1, 30). FIG. 8*b* shows a plane view at main deck comprising ten four-lobe cargo tanks (1) and five cryogenic cargo tanks (30) that are arranged seven in a row and two in the breadth, and one fore cryogenic cargo tank (30) in forward portion of said vessel (0) with combi cargo tanks (4, 1, 30).

Figure 9A:
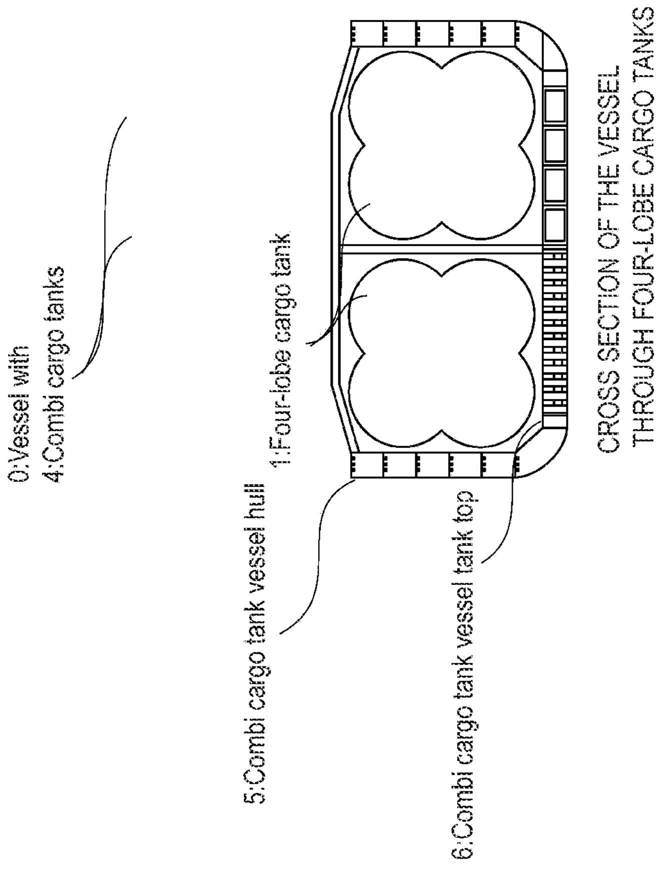

FIG. 9*a* shows a cross-section view of a vessel (0) with combi cargo tanks (4) with axial (20)-transverse sections through two four-lobe cargo tanks (1) arranged onboard said vessel (0) with combi cargo tanks (4). The Figure shows longitudinally oriented horizontally installed four-lobe cargo tanks (1) on said combi cargo tank vessel tank top (6) in said combi cargo tank vessel hull (5).

Figure 9B:
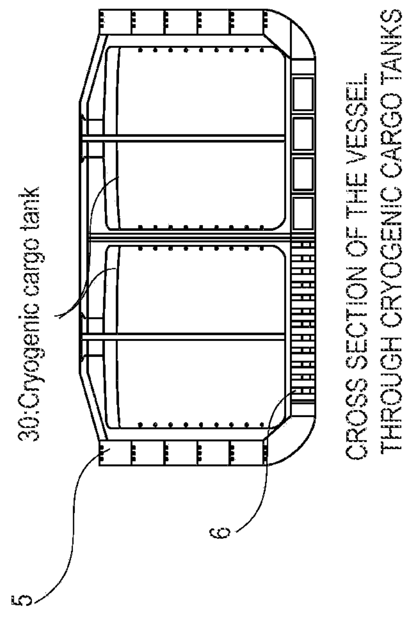

FIG. 9*b* shows a cross-section view of said vessel (0) with combi cargo tanks (4) with a cross-section view of vertical-axis embodiments of two cryogenic cargo tanks (30) arranged onboard said vessel (0) with combi cargo tanks (4, 1, 30).

EMBODIMENTS OF THE INVENTION

The present invention provides a four-lobe cargo tank (1) for transporting and/or storage of liquified gases,

- wherein the tank (1) comprises four main lobes (11) each with a cylinder sector outer shell (12) and main lobe axis (a11),
- said four main lobes (11) arranged with said four main lobe axis (a11) axial-parallel with and about a common main central axis (a1),
- said four main lobes (11) joined by four web frames (17) with four corresponding diagonally arranged perforated bulkheads (16) directed outwardly from said main central axis (a1),
- said tank (1) further comprises first and second end covers (13*a*, 13*b*) each end cover (13*a*, 13*b*) comprising four quarter spherical shell portions (14*a*, 14*b*) each forming an end portion of said cylinder sector outer shell (12),
- said quarter spherical shell portions (14*a*, 14*b*) of said first and second end covers (13*a*, 13*b*) respectively, joined and closing toward said main central axis (a1) by first and second four diagonally arranged cylindrical 45-degree cut pipe portions (15*a*, 15*b*) each arranged with its axis (a15) transverse to said main axis (a1).

The invention provides a four-lobe cargo tank (1) for transporting liquified CO2 to e.g. enhanced oil recovery sequestration, based on CO2 gas injection, one way, and which in a further embodiment is arranged to return with other kinds of liquified or pressurized gas, such as LNG, LPG or Ammonia. Due to the utilization of the tank for transport of gases in both directions the trade will be lucrative, both economically and environmentally, as the cargo tanks can be utilized both ways and the returning voyage is profitable over an empty return.

An advantage with the four-lobe tank (1) is that the structural features of four main lobes (11) increases the overall strength qualities' over a regular cylindrical tank.

The four-lobe tank (1) with same cargo conditions, as pressure, will have an about four times increased volume over a regular cylindrical tank with same shell thickness. This is a benefit as the four-lobe tank (1) can hold more cargo with same design criterias than an individual regular cylindrical tank, thus take up less space onboard a vessel. In other words, the footprint of the four-lobe tank (1), when installed with vertical axis, is only 66% of the footprint of four individual cylindrical tanks of equal radii as the lobes (11) radii.

An other advantage with the four-lobe tank (1), is that the internal structure joined by four web frames (17) with four corresponding diagonally arranged perforated bulkheads (16) directed outwardly from said main central axis (a1), increases the strength with regard to holding cargo with relatively high density during transport, such as holding as liquefied CO2.

In an embodiment of the invention the four-lobe cargo tank (1) further comprises a central pipe (20) that is arranged co-axial with said main central axis (a1), wherein

- said central pipe (20) joining said first and second four diagonally arranged cylindrical 45-degree cut pipe portions (15*a*, 15*b*), respectively, and said four web frames (17), near either end portions of said central pipe (20),
- said four perforated bulkheads (16) extending radially out from said central pipe (20). In other words, the four perforated bulkheads are joined by said central pipe (20).

The reason behind this arrangement is to arrange cargo pipes for loading and unloading said four-lobe cargo tank (1) with liquified gases through said central pipe (20). Another benefit is that cables, such as for instrumentation and power, can also be run through said central pipe (20), and when said four-lobe cargo tanks (1) are built in large scale, then even passages for manual human inspection and manholes into to the main lobes (11) can be arranged through the central pipe (20). Another benefit is that the weld joint between the four diagonally arranged perforated bulkheads (16) and the four web frames (17) can be connected at said central pipe (20), the same applies for the said central pipe (20) joining said first and second four diagonally arranged cylindrical 45-degree cut pipe portions (15*a*, 15*b*) which can be welded towards the central pipe (20).

In an embodiment of the invention, wherein said four-lobe cargo tank (1), further comprises at least one circumferential reinforcing ring stiffener (18) to reinforce said cylinder sector outer shell (12). Said circumferential reinforcing ring stiffener (18) prevents buckling on said outer shell (12). Another benefit is that said four-lobe cargo tank (1) can resist higher internal pressure without increasing thicknesses of said cylinder sector outer shell. Such reinforcing ring stiffeners (18) can also be used as structural support for the arrangement onboard a vessel (0). Said reinforcing ring stiffener(s) (18) can be arranged on the outside of said four-lobe cargo tank (1) [as shown on FIGS. 3*a*-3*c*], or on the inside of said four-lobe cargo tank (1). If said reinforcing ring stiffener (18) is arranged on the inside of said four-lobe cargo tank (1), said reinforcing ring stiffener (18) becomes a part of the internal structure of said four-lobe cargo tank (1).

In an embodiment of the invention, each said second four diagonally arranged cylindrical 45-degree cut pipe portions (15*b*) with its transversely arranged axis (a15) is inclined toward the corresponding end portion of said central common pipe (20). Such an arrangement in order to enable liquid draining of the tank towards and into a drain in the central common pipe (20) when installed in a vertical position. In an embodiment of the invention the inclination angle $\alpha$ is 5 degrees.

In an embodiment of the invention said liquefied gases comprise liquefied carbon dioxide.

In an another embodiment of the invention, said liquefied gases comprise liquefied natural gas, liquefied ammonia, or compressed natural gas.

In an embodiment of the invention the four-lobe cargo tank (1) is a pressure vessel for pressure up to 12 barg [bar=bar gauge]. In another embodiment of the invention the four-lobe cargo tank (1) is a pressure vessel for pressure up to 8 barg. In another embodiment of the invention the four-lobe cargo tank (1) is a pressure vessel for pressure above 5,2 barg.

In a further embodiment of the invention said pressure vessel is also cryogenic arranged for holding liquefied Carbon Dioxide (CO2).

In a further embodiment of the invention said pressure vessel is also arranged for holding liquefied natural gas (LNG) at ambient pressure.

In an embodiment of the invention the four-lobe cargo tank (1) is arranged to be installed onboard a vessel (0).

In an embodiment of the invention the four-lobe cargo tank (1) is arranged to be installed with cryogenic cargo tanks (30) onboard a vessel (0) with combi cargo tanks (4).

In an embodiment of the invention, wherein said web frames (17) protrude out between said four main lobes (11), so that said web frames (17) also serve as flanges for connection said four main lobes (11) and reinforce said four-lobe cargo tank (1). This will reinforce the structure of the cargo tank (1) and is useful especially when the cargo tank serve as a pressure vessel.

In an embodiment of the invention said four-lobe cargo tank (1) construction materials have qualification with enhanced mechanical properties for low temperature service.

In an embodiment of the invention said central pipe (20) protrude beyond each end cover (13). In a further embodiment of the invention said central pipe (20) protrusions are arranged as main being bearing points of said four-lobe cargo tank (1).

In an embodiment of the invention said central pipe (20) protrude from one or more end cover (13) and said central pipe (20) protrusion(s) is/are arranged as lifting point(s) of said four-lobe cargo tank (1).

In an embodiment of the invention said four-lobe cargo tank (1) material is low temperature steel, such as carbon manganese steel, nickel steel, stainless steel.

In an embodiment of the invention said four-lobe cargo tank (1) material comprises cryogenic materials, such as nickel steel e.g. 9% Ni, stainless steel, high manganese steel e.g. NV-Mn400.

In an embodiment of the invention said four-lobe tank (1) material is a combination of low temperature steel and cryogenic materials.

In an embodiment of the invention, related to a method of transporting gas, comprising

- using a vessel (0) according to the above,
- loading liquefied natural gas (LNG) under cryogenic conditions to said one or more four-lobe tanks (1) at an LNG loading terminal,
- sailing said vessel (0) to an LNG unloading terminal,
- unloading said liquefied natural gas (LNG) at said unloading terminal for consumption,
- if necessary, sailing said vessel (0) to a loading terminal for liquefied carbon Dioxide (CO2)
- loading captured liquefied Carbon Dioxide (CO2) into said one or more four-lobe tanks (1),
- sailing said captured liquefied Carbon Dioxide (CO2) to a liquefied Carbon Dioxide (CO2) unloading terminal, for permanent storage,
- or for industrial consumption.

In an other embodiment of the invention, related to a method of transporting gas, comprising

- using a vessel (0) according to any of the embodiments above,
- loading liquefied natural gas (LNG) under cryogenic conditions to one or more cryogenic cargo tanks (30) at an LNG loading terminal,
- sailing said vessel (0) to an LNG unloading terminal,
- unloading said liquefied natural gas (LNG) at said unloading terminal for storage, further transport or consumption,

- if necessary, sailing said vessel (0) to a loading terminal for liquefied carbon Dioxide (CO2),
- loading captured liquefied Carbon Dioxide (CO2) into said one or more four-lobe tanks (1),
- sailing said captured liquefied Carbon Dioxide (CO2) to a liquefied Carbon Dioxide (CO2) unloading terminal, for permanent storage,
- or for industrial consumption.

Reference table

| | |
|---|---|
| α | inclining angle of transversely arranged axis (a15) |
| 0 | Vessel, typ. liquefied gas carrier |
| 1 | Four-lobe tank |
| a1 | Common main central axis (1 off) |
| 11 | Main lobe (4 off) |
| a11 | Main lobe axis (4 off) |
| 2 | Vessel hull, typ. hull of a ship |
| 3 | Vesel tank top |
| 4 | Vessel (0) with combi cargo tanks |
| 5 | Combi cargo tank vessel hull |
| 6 | Combi cargo tank vessel tank top |
| 12 | Cylinder sector outer shell, (4 off) |
| 13a | First end cover, (2 off) |
| 13b | Second end cover, (2 off) |
| 14a | First quarter spherical shell portion, (4 off) |
| 14b | Second quarter spherical shell portion, (4 off) |
| 15a | First cylindrical 45-degree cut pipe portion, (4 off) |
| 15b | Second cylindrical 45-degree cut pipe portion, (4 off) |
| a15 | Transverse axis (a15) for cylindrical 45-degree cut pipe portion, (4 off) |
| 16 | Perforated bulkhead (4 off) |
| 17 | Web frame (4 off) |
| 18 | Circumferential reinforcing ring stiffener |
| 20 | Central pipe (1 off) |
| 30 | Cryogenic cargo tank, typ. LNG cargo tank |

The invention claimed is:

1. A four-lobe cargo tank for transporting and/or storage of liquified gases,

- wherein the tank comprises four main lobes, each with a cylinder sector outer shell and main lobe axis,
- wherein said four main lobes are arranged with said four main lobe axis axial-parallel with and about a common main central axis,
- wherein said four main lobes are joined by four web frames with four corresponding diagonally arranged perforated bulkheads directed outwardly from said main central axis,
- wherein said tank further comprises first and second end covers, each end cover comprising four quarter spherical shell portions, each forming an end portion of said cylinder sector outer shell, and
- wherein said quarter spherical shell portions of said first and second end covers, are respectively joined and closing toward said main central axis by first and second four diagonally arranged cylindrical 45-degree cut pipe portions, each arranged with an axis thereof transverse to said main central axis.

2. The four-lobe cargo tank of claim 1, further comprising a central pipe arranged co-axial with said common main central axis,

- wherein said central pipe join said first and second four diagonally arranged cylindrical 45-degree cut pipe portions and said four web frames at either end portion of said central pipe, and
- wherein said four perforated bulkheads extend radially out from said central pipe.

3. The four-lobe cargo tank of claim 1, further comprising at least one circumferential reinforcing ring stiffener to reinforce said cylinder sector outer shell.

4. The four-lobe cargo tank of claim 1, wherein said second four diagonally arranged cylindrical 45-degree cut pipe portions with the transversely arranged axis are inclined toward the corresponding end portion of said central common pipe.

5. The four-lobe cargo tank of claim 1, wherein said liquefied gases comprise liquefied carbon dioxide.

6. The four-lobe cargo tank of claim 5, further arranged for said liquefied gases to comprise liquefied natural gas, liquefied ammonia, or compressed natural gas.

7. The four-lobe cargo tank of claim 1, is a pressure vessel for pressure up to 12 barg.

8. The four-lobe cargo tank of claim 7, wherein said pressure vessel is also cryogenic arranged for holding liquefied Carbon Dioxide (CO2).

9. The four-lobe cargo tank of claim 1, further arranged for holding liquefied natural gas (LNG) at ambient pressure.

10. A vessel comprising at least one four-lobe cargo tank according to claim 1.

11. A method of transporting gas, comprising the steps of:
using the vessel according to claim 10;
loading liquefied natural gas (LNG) under cryogenic conditions to said one or more four-lobe tanks at an LNG loading terminal;
sailing said vessel to an LNG unloading terminal;
unloading said liquefied natural gas (LNG) at said unloading terminal for consumption;
if necessary, sailing said vessel to a loading terminal for liquefied carbon Dioxide (CO2);
loading captured liquefied Carbon Dioxide (CO2) into said one or more four-lobe tanks; and
sailing said captured liquefied Carbon Dioxide (CO2) to a liquefied Carbon Dioxide (CO2) unloading terminal for permanent storage, or for industrial consumption.

12. A method of transporting gas, comprising the steps of:
using the vessel according to claim 10;
loading liquefied natural gas (LNG) under cryogenic conditions to one or more cryogenic cargo tanks at an LNG loading terminal;
sailing said vessel to an LNG unloading terminal;
unloading said liquefied natural gas (LNG) at said unloading terminal for consumption;
if necessary, sailing said vessel to a loading terminal for liquefied carbon Dioxide (CO2);
loading captured liquefied Carbon Dioxide (CO2) into said one or more four-lobe tanks;
sailing said captured liquefied Carbon Dioxide (CO2) to a liquefied Carbon Dioxide (CO2) unloading terminal for permanent storage, or for industrial consumption.

13. A vessel comprising at least one four-lobe cargo tank according to claim 2.

14. A vessel comprising at least one four-lobe cargo tank according to claim 3.

15. A vessel comprising at least one four-lobe cargo tank according to claim 4.

16. A vessel comprising at least one four-lobe cargo tank according to claim 5.

17. A vessel comprising at least one four-lobe cargo tank according to claim 6.

18. A vessel comprising at least one four-lobe cargo tank according to claim 7.

19. A vessel comprising at least one four-lobe cargo tank according to claim 8.

20. A vessel comprising at least one four-lobe cargo tank according to claim 9.

* * * * *